June 16, 1925.
J. P. RAVELO
FRONT FENDER FOR AUTOMOBILES
Filed Nov. 24, 1923
1,542,273
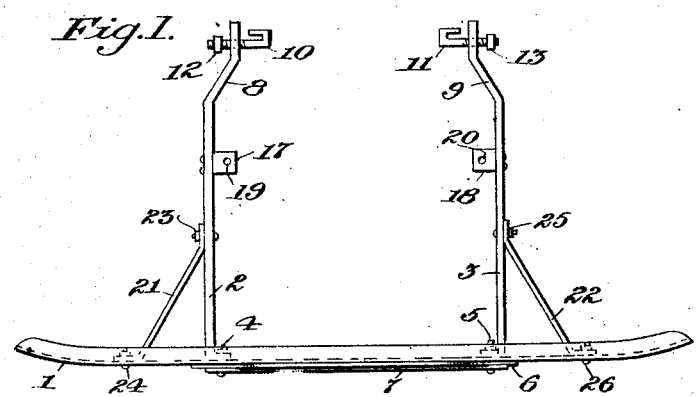
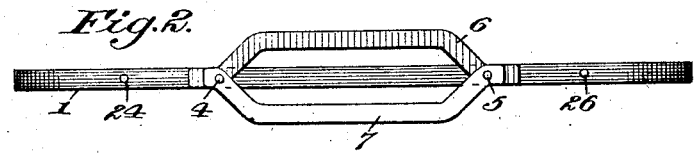
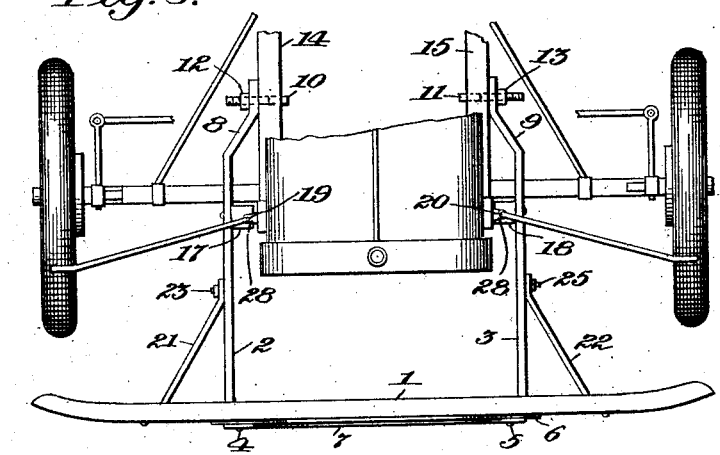
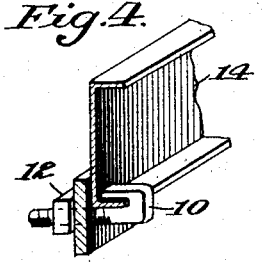
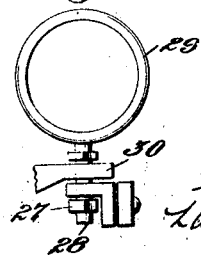
Inventor:
J. P. Ravelo,
By Langner, Parry, Card & Langner
Att'ys.

Patented June 16, 1925.

1,542,273

UNITED STATES PATENT OFFICE.

JUAN P. RAVELO, OF HABANA, CUBA.

FRONT FENDER FOR AUTOMOBILES.

Application filed November 24, 1923. Serial No. 676,728.

*To all whom it may concern:*

Be it known that I, JUAN P. RAVELO, a citizen of Cuba, residing at Habana, Cuba, have invented certain new and useful Improvements in a Front Fender for Automobiles, of which the following is a specification.

The present invention is designed for use on the front part of automobile vehicles and more particularly of those of the "Ford" type.

Objects of the present invention are, to improve the construction, decrease the cost of production, and increase the efficiency, of devices of this character.

The invention is illustrated in the accompanying drawings and explained in detail hereinafter, and the novel features thereof set forth in the claims.

In the drawing:

Fig. 1 is a plan view of the device.

Fig. 2 is a front elevation of Fig. 1.

Fig. 3 is a partial plan view of the front of a Ford car equipped with the fender forming the invention.

Fig. 4 is a detail view of the attaching hooks for connecting the device to the chassis of the automobile.

Fig. 5 is a detail showing of the headlight supports of a Ford machine and which are utilized for attaching the device.

Referring to the drawings, the fender is formed of a buffer member 1, having an angular cross section, which is united to attaching rails 2 and 3, by means of bolts 4 and 5, which in turn, unite said buffer member 1 and bumper members 6 and 7, which together form the bumper per se. The attaching bars 2 and 3 have bent free ends 8 and 9, and are provided with hooked clamps 10 and 11, having nuts 12 and 13, for rigidly affixing the attaching bars 2 and 3 to the channels 14 and 15 of the automobile chassis, as further explained hereinafter. Other means for attaching the bumper to the machine, are provided by two wing plates 17 and 18, fastened to bars 2 and 3, for uniting the fender more firmly to the machine forward of bolts 10 and 11, said plates having openings 19 and 20, for cooperating with the headlight supports. Connected by bolts 23, 24, 25 and 26 to the members 2 and 3, as well as to buffer 1 are braces 21 and 22.

To attach the fender to a Ford automobile nuts 27 of the light supports are unscrewed from the arms used for supporting headlights 29, said arms being in turn supported by members 30 which are suitably attached to the chassis of the automobile. With the nuts 27 removed the fender is positioned with the openings 19 and 20 receiving the arms 28, and then the nuts 27 are loosely screwed on. The nuts 12 and 13 are unscrewed from the clamps 10 and 11, which are then engaged with the lower flange of the channels 14 and 15, as shown in Fig. 4. All that remains to be done is to tighten up the nuts 27, and nuts 12 and 13, and the fender is firmly attached to the automobile and ready for use.

It is to be understood that the accompanying drawings are to be considered solely as illustrative and in no way limiting. It is obvious that certain changes may be made without departing from the scope of the invention as defined in the following claims:

1. A front fender for automobile vehicles, preferably of the Ford type, comprising a buffer of angular cross section, two bumper members connected to the buffer, bent ended bars connected to the buffer, attaching means to fix the bars to a vehicle, said attaching means comprising, a plate connected to each of the bars and having an opening for receiving the standard head light support rods, whereby the fender can be securely attached to a Ford type machine by means of the standard structure of the machine, and without alteration of the same.

2. A front fender for automobile vehicles, preferably of the Ford type, comprising a buffer of angular cross section, two bumper members connected to the buffer, bent ended bars connected to the buffer, attaching means to fix the bars to a vehicle, said attaching means comprising, hooks provided with nuts and positioned in the bent ends of the bars, and a plate connected to each of the bars and having an opening for receiving the standard head light support rods, whereby the fender can be securely attached to a Ford type machine by means of the standard structure, of the machine, and without alteration of the same.

In testimony whereof I have signed my name to this specification.

JUAN P. RAVELO.